US012536632B2

(12) United States Patent
Johnson et al.

(10) Patent No.: US 12,536,632 B2
(45) Date of Patent: Jan. 27, 2026

(54) SYSTEMS AND METHODS FOR DETECTING BLIGHT AND CODE VIOLATIONS IN IMAGES

(71) Applicant: The Board of Trustees of the University of Alabama, Tuscaloosa, AL (US)

(72) Inventors: Erik Barry Johnson, Northport, AL (US); Brendan August Moore, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 388 days.

(21) Appl. No.: 17/383,551

(22) Filed: Jul. 23, 2021

(65) Prior Publication Data

US 2022/0036537 A1    Feb. 3, 2022

Related U.S. Application Data

(60) Provisional application No. 63/057,592, filed on Jul. 28, 2020.

(51) Int. Cl.
*G06T 7/00* (2017.01)
*B60R 11/04* (2006.01)
(Continued)

(52) U.S. Cl.
CPC ........ *G06T 7/0002* (2013.01); *G06F 18/2178* (2023.01); *G06N 5/04* (2013.01);
(Continued)

(58) Field of Classification Search
CPC ......... G06T 7/0002; G06T 2207/20081; G06T 2207/30184; G06T 2207/30188;
(Continued)

(56) References Cited

U.S. PATENT DOCUMENTS 9,898,688 B2 *   2/2018   Bleiweiss ................ G06T 7/90
10,182,214 B2 *  1/2019   Gornik ................... H04N 7/185
(Continued)

OTHER PUBLICATIONS

Pough, Bradley and Qian Wan. 2007. Data Analytics and the Fight Against Housing Blight: A Guide for Local Leaders. Responsive Communities (Mar. 2017). (Year: 2017).*
(Continued)

*Primary Examiner* — Amandeep Saini
*Assistant Examiner* — Daniella M. DiGuglielmo
(74) *Attorney, Agent, or Firm* — Meunier Carlin & Curfman LLC

(57) ABSTRACT

A system for blight and code violation detection is provided. The system includes a machine learning model that is trained using photographs of properties that are associated with blight and code violations and photographs that are not associated with blight and code violations. A fleet of vehicles, such as trash trucks, are equipped with cameras to take photographs of properties along their routes. The trained model may generate a score for each photograph that indicates whether or not a property is blighted or has code violations. Those properties with a score that exceeds a threshold may be provided to a reviewer who may verify the finding. If the finding is verified, the reviewer may issue a letter or citation to the owner of the property, and positive feedback may be provided to the model. If the finding is not verified, negative feedback may be provided to the model.

19 Claims, 12 Drawing Sheets

(51) Int. Cl.
| | |
|---|---|
| *G06F 18/21* | (2023.01) |
| *G06N 5/04* | (2023.01) |
| *G06N 20/00* | (2019.01) |
| *G06Q 30/018* | (2023.01) |
| *G06Q 50/26* | (2024.01) |
| *G06V 10/40* | (2022.01) |
| *G06V 10/74* | (2022.01) |
| *G06V 20/56* | (2022.01) |
| *G06V 20/58* | (2022.01) |

(52) U.S. Cl.
CPC .......... *G06N 20/00* (2019.01); *G06Q 30/018* (2013.01); *G06Q 50/26* (2013.01); *G06V 10/40* (2022.01); *G06V 20/56* (2022.01); *B60R 11/04* (2013.01); *G06T 7/0004* (2013.01); *G06T 2207/10024* (2013.01); *G06T 2207/20081* (2013.01); *G06T 2207/30184* (2013.01); *G06T 2207/30188* (2013.01); *G06V 10/761* (2022.01); *G06V 20/58* (2022.01)

(58) Field of Classification Search
CPC ......... G06T 2207/10024; G06T 7/0004; G06F 18/2178; G06N 5/04; G06N 20/00; G06Q 30/018; G06Q 50/26; G06V 20/56; G06V 10/40; G06V 10/761; G06V 20/58; B60R 11/04
See application file for complete search history.

(56) References Cited

U.S. PATENT DOCUMENTS

| | | | | |
|---|---|---|---|---|
| 2016/0048934 | A1* | 2/2016 | Gross | G06V 10/40 705/313 |
| 2019/0304026 | A1* | 10/2019 | Lyman | G06Q 40/08 |
| 2020/0088534 | A1* | 3/2020 | Nakirikanti | G06F 16/906 |

OTHER PUBLICATIONS

Wheelie Waste. Garbage Trucks With Cameras Will Report on Residents Who Put Rubbish in The Wrong Bins. (Oct. 2017) (Year: 2017).*
Prince William County Government, "PCE Overview", pwcva.org, 2020. (Year: 2020).*
Crothers, H., "Fight Blight with ArcGIS and Artificial Intelligence", esri, 2018. (Year: 2018).*
Mertz et al., "City-Wide Road Distress Monitoring with Smartphones", 2014, pp. 1-9. (Year: 2014).*
Esmaili, Rohollah, et al. "Mapping of understory infested boxwood trees using high resolution imagery." Remote Sensing Applications: Society and Environment 18 (Apr. 2020): 100289.
Pough, Bradley, and Qian Wan. "Data analytics and the fight against housing blight: A guide for local leaders." (2017).
Zou, Shengyuan, and Le Wang. "Individual vacant house detection in very-high-resolution remote sensing images." Annals of the American Association of Geographers 110.2 (2020): 449-461. Published online: Oct. 22, 2019.
City of Memphis: Detecting potholes for better citizen experiences. City of Memphis Case Study | Google Cloud. Link: *City of Memphis Case Study | Google Cloud* Nov. 12, 2019.
Howard Crothers, Fight Blight with ArcGIS and Artificial Intelligence Fight Blight with ArcGIS and Artificial Intelligence (esri.com) Link: *Fight Blight with ArcGIS and Artificial Intellig* (esri.com) Aug. 20, 2018.

* cited by examiner

100

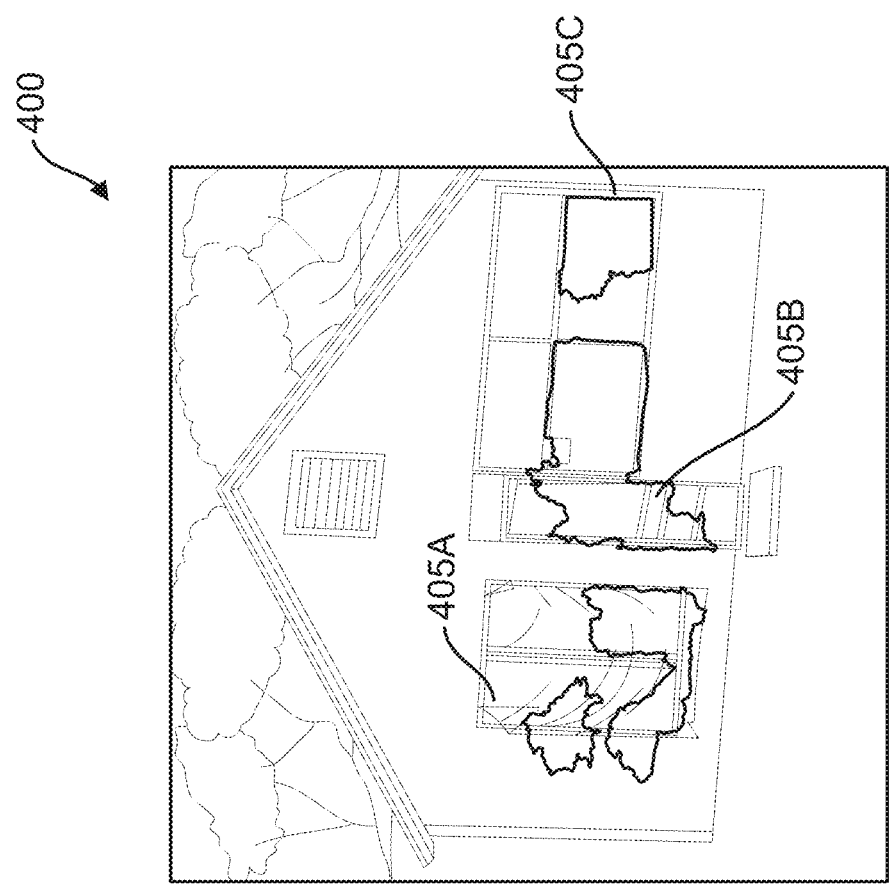
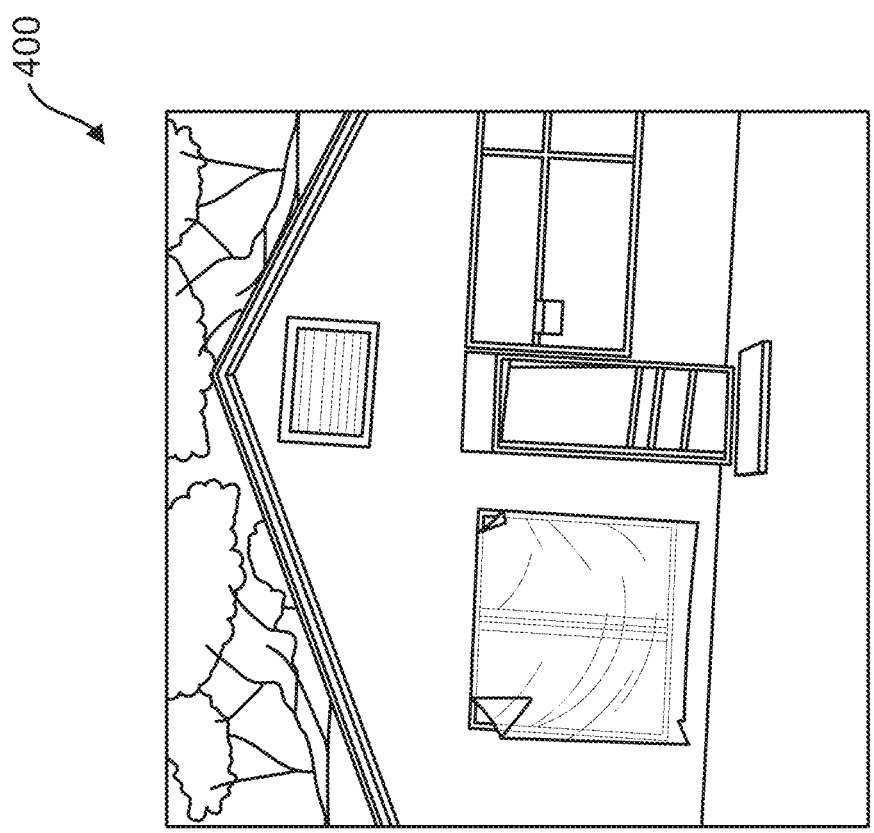
FIG. 4B
FIG. 4A

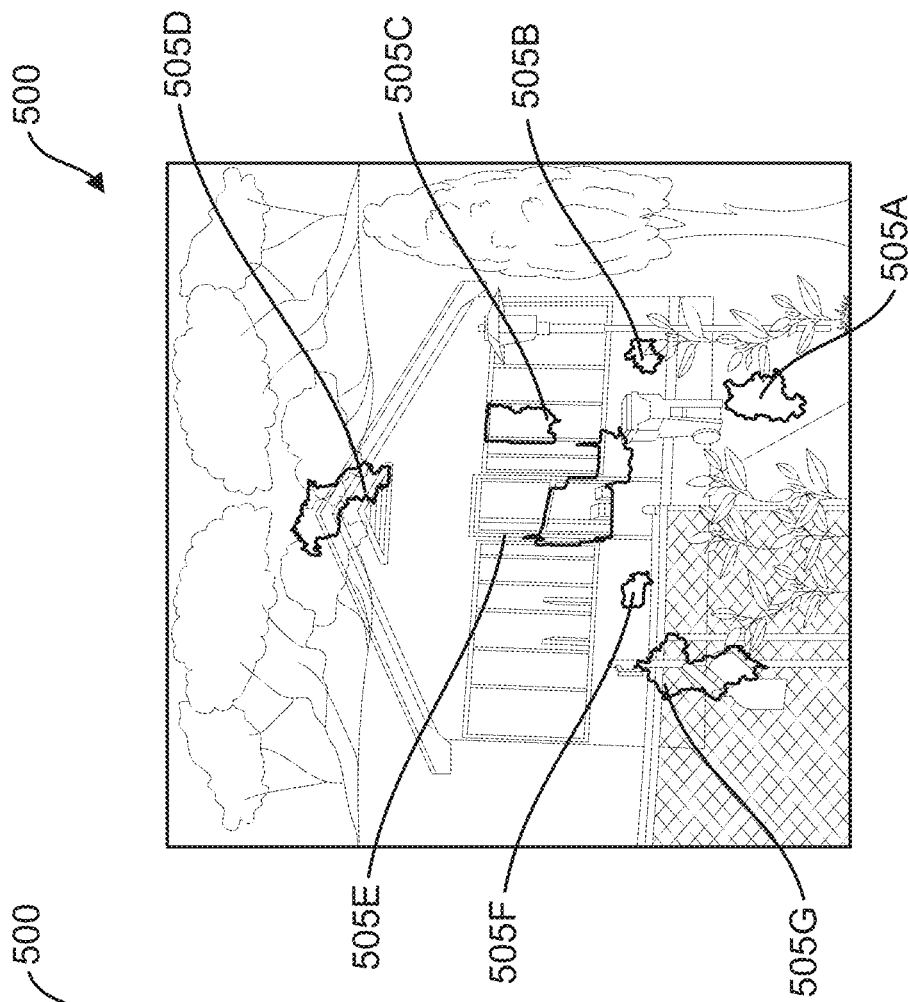
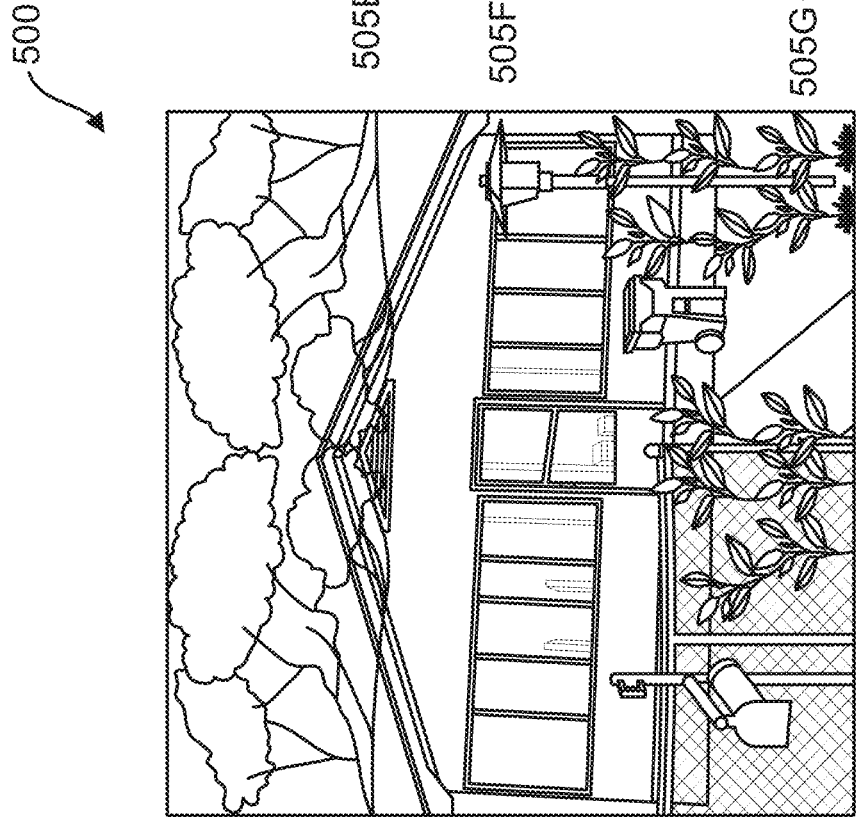
FIG. 5B
FIG. 5A

800

1000

1100

SYSTEMS AND METHODS FOR DETECTING BLIGHT AND CODE VIOLATIONS IN IMAGES

CROSS-REFERENCE TO RELATED APPLICATIONS

This application claims priority to U.S. Provisional Patent Application Ser. No. 63/057,592, filed on Jul. 28, 2020, and titled "SYSTEMS AND METHODS FOR DETECTING BLIGHT IN IMAGES." The contents of which are hereby incorporated by reference in their entirety.

BACKGROUND

Currently, monitorization of housing blight and property code violations depends on manual labor. Cities typically rely on eye-witness complaints to identify blighted properties and one or more inspectors to visually inspect properties.

However, there are drawbacks associated with these approaches. First, relying on eye-witness complaints may result in uneven or incomplete detection of blighted properties. As may be appreciated some blocks or neighborhoods may have more engaged citizens than others, which may lead to more blight detection in those blocks and neighborhoods than in blocks and neighborhoods with less engaged citizens. In addition, some citizens may not be comfortable interacting with authorities and therefore may be reluctant to report blighted properties, which may result in the under detection of blighted properties.

Second, even where inspectors are used, there are costs that may limit blight detection. These costs include salaries for the inspectors, costs of vehicles for inspectors including fuel and maintenance, and costs associated with the gear and computing devices that are needed to support the inspectors.

Third, currently inspectors physically visit the properties that they are inspecting. This may pose risks to inspectors including risks associated with dangerous conditions on the properties, risks associated with contracting infectious diseases, and risks associated with confrontations with property owners who may not welcome inspectors on their properties.

SUMMARY

In one embodiment, an automated system for blight and code violation detection is provided. The system includes a machine learning model that is trained using photographs of properties that are known to be associated with code violations or blight and photographs that are known to be not associated with code violations or blight. The trained model may generate a score for each photograph that indicates whether or not a depicted property is blighted or has a code violation. Those properties with a score that exceeds a threshold may be provided to a reviewer who may verify the finding of blight and/or code violations. If the finding of blight or code violations is verified, the reviewer may issue a letter or citation to the owner of the property, and positive feedback may be provided to the model. If the finding of blight or code violations is not verified, negative feedback may be provided to the model. The photographs of properties that are fed to the trained model may be captured by drones, and municipal vehicles such as garbage trucks, for example. Any type of public or private vehicle may be used.

Note that the embodiments described herein are not limited to detecting blight or code violations on properties but may be used to detect blight (e.g., defects or problems) on a variety of objects. For example, embodiments may be used to detect defects (e.g., cracks and potholes) in road segments, defects in sidewalks (e.g., cracks and missing concrete), and defects in trees (e.g., dead branches, trees needing pruning, and overgrown foliage).

The systems and methods described herein provide many advantages over the prior art. First, because the properties with blight or code violations are automatically identified by the model, the number of inspectors needed to identify such properties is greatly reduced leading to an overall decrease in the cost of blight detection and code inspection. Second, because existing city vehicles such as garbage trucks are used to collect the photographs that are used by the algorithm, cities and municipalities no longer have to rely on concerned citizens or inspectors to identify a possible blighted property or code violation. Third, because the number of property visits that are performed by inspectors are reduced, the overall safety of inspectors is increased. Fourth, because the model may identify specific improvements to declassify the property as blighted and mitigate code violations (e.g., paint house, repair windows, or fix gutters), the likelihood that the property owner will take steps to improve the property is increased. This may lead to a more uniform and equitable distribution of blight detection and code enforcement across all of the blocks and neighborhoods of cities and municipalities.

Note that blight detection and code enforcement is not a problem that is limited to governments and municipalities. For example, companies or individuals who own a large number of properties may also have a need to automatically detect those properties that have become blighter or at risk for violating a particular code.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings:

FIG. 4A is an illustration of an image of a third example property;

FIG. 4B is an illustration of the image of the third example showing a plurality of features;

FIG. 5A is an illustration of an image of a fourth example property;

FIG. 5B is an illustration of the image of the fourth example showing a plurality of features;

DETAILED DESCRIPTION

Figure 1:
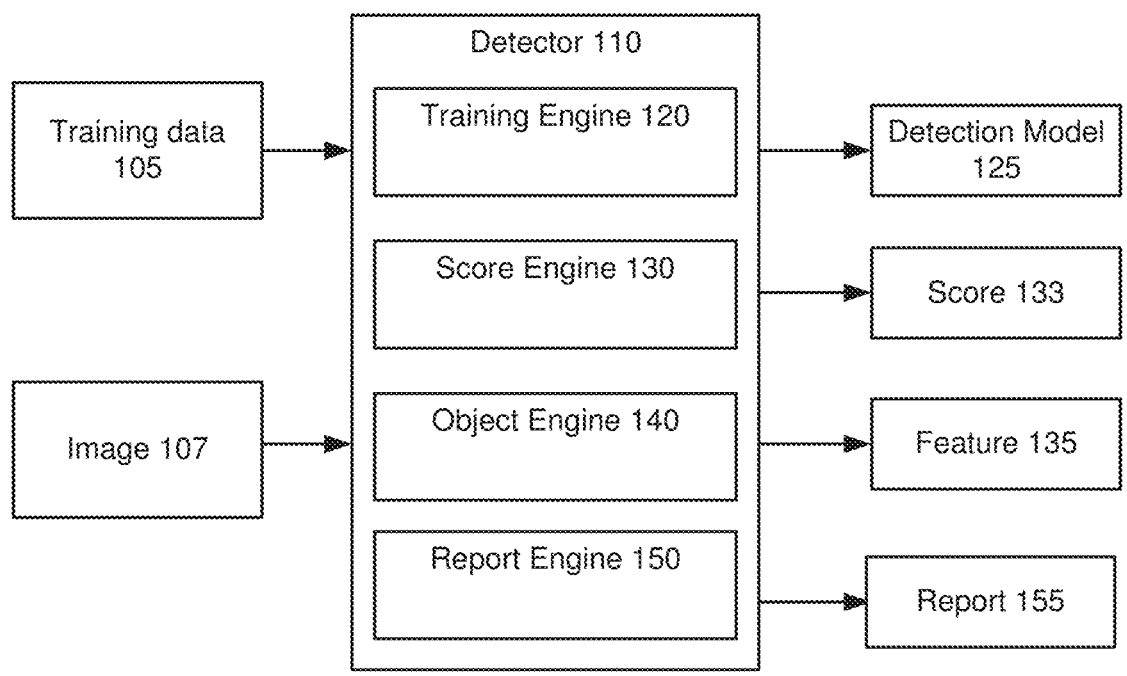
FIG. 1 is an illustration of an exemplary environment 100 for detecting blight or code violations in properties.

FIG. 1 is an illustration of an exemplary environment 100 for detecting blight or code violations in properties. Properties as used herein may refer to a variety of different property types such as homes, parcels, buildings, sidewalks, roads or road segment, vehicles, tree, bushes, etc. Any type of public or private property may be included. As used herein a property is blighted if it appears to be any one of dilapidated, unsafe, or unsightly.

Whether or not a property is blighted may depend on the type of property. For example, for homes, a home may be considered blighted if it has exterior conditions such as peeling paint, broken or boarded up windows and doors, broken or missing gutters, overgrown plants, or overgrown or missing lawn segments. A road segment may be considered blighted if it has one or more cracks or potholes or missing lines. A tree may be considered blighted if it appears overgrown, is touching one or more powerlines, has dead or dying branched, or shows signs of disease or insect infestation.

A property has a code violation when an aspect of the property does not comply with a particular state or local regulation. These regulations often pertain to physical aspects of the property such the condition of the exterior paint, conditions of the windows, the presence of trash or automobiles in the yard, and the length of the lawn or other conditions of the landscape. While blight is related to code violations in that a blighted property is likely to also have code violations, they are not the same. For example, a property may be overall considered to be blighted but may not have any one isolated feature that rises to the level of a code violation.

As described above, municipalities and local governments, as well as private sector property managers, have an interest in reducing the number of blighted properties or properties with code violations in their jurisdictions. With respect to properties such as houses, local governments typically employ one or more inspectors who may patrol neighborhoods looking for blighted properties or code violations or may investigate reports of blighted properties an code violations provided by neighbors. As a result, detecting and reducing blight and code violations is an expensive and time-consuming task.

In order to automate the detection of blighted properties and code violations, the environment 100 includes a detector 110. In the examples shown, the detector 110 includes several components including, but not limited to, a training engine 120, a score engine 130, an object engine 140, and a report engine 150. The components of the detector 110 may be implemented together or separately by one or more computing devices such as the computing device 1200 illustrated with respect to FIG. 12.

The training engine 120 may receive training data 105 and may generate a detection model 125 using the received training data 105. In some embodiments, the training data 105 may include images of properties. Each property may be associated with a location of the property (e.g., an identifier of a parcel or address corresponding to the property or a set of GPS coordinates associated with the property). The images in the training data 105 may be received from a variety of sources such as Google Street View. Other image sources may be used. Each image in the training data 105 may be approximately the same size and resolution.

The images in the training data 105 may be labeled as either being blighted or non-blighted. In addition, each image may be labeled with any code violations that the property may have. The labels may be generated by human reviewers based on an inspection of each image. In some embodiments, the labels may be binary (i.e., blighted or non-blighted, or violating a particular code or not violating the particular code). In other embodiments, the labels may be scores that indicate the relative blight associated with each image, or severity of the code violation. For example, an image of a property with no blight may get a score of zero, an image of a property with some peeling paint may receive a blight score of 15, and an image of a property that is extremely blighted (e.g., boarded up windows, graffiti, and missing gutters) may receive a maximum score of 100. Other scoring scales may be used.

The training engine 120 may generate the detection model 125 using the training data 105. In some embodiments, the training engine 120 may generate the detection model 125 by first extracting features from each of the images from the training data 105. Each feature may be a contiguous area or region of similarly colored pixels. The training engine 120 may use the extracted features to determine features, or combinations of features, that are associated with images of the training data 105 that are labeled as blighted or in violation of a particular code and to determine features, or combinations of features, that are associated with images of the training data 105 that are labeled as non-blighted or not in violation of a particular code. The identified features may then be used by the training engine 120 to generate the detection model 125. Any method for generating a model, such as machine learning, may be used. The detection model 125 may generate a score 133 for an image 107, may identify features of the property depicted in the image 107 that contributed to the score, and may also provide recommendations as to repairs that may reduce the generated score 133.

In some embodiments, rather than a single detection model 125. Multiple models 125 may be trained with each model 125 associated with a different type of code violation. For example, a model 125 may be trained to detect code violations related to peeling paint. Another model 125 may be trained to detected code violations related to broken windows or doors.

After the detection model 125 (or models 125) is trained, the score engine 130 may receive one or more images 107, and may use the detection model 125 to generate a score 133 for the property depicted in the image 107. Depending on the embodiment, the score 133 may be a number from 0 to 100 that indicates the amount that the property depicted in the image is blighted or has one or more code violations. A score 133 of 0 may indicate that the detection model 125 finds the property depicted in the image 107 contains no blight or code violations, while a score 133 of 100 may indicate that the detection model 125 finds the property depicted in the image 107 to be extremely blighted or to have multiple code violations.

In some embodiments, the images 107 may be provided to the score engine 130 from one or more municipal vehicles. For example, a municipal vehicle such as a garbage truck may be equipped with one or more cameras. As the garbage truck moves along its route, the cameras may capture images 107 of each property adjacent to the garbage truck. Each image 107 may be tagged with a location (e.g., GPS coordinate) that may be used to associate each image 107 with an address or other identifier of the property depicted in the image 107. Each image 107 may be transmitted from the garbage trucks to the score engine 130 via a wireless network (e.g., cellular or Wi-Fi), or the images 107 may be stored on a storage medium associated with the garbage truck and may be periodically provided to the score engine 130 by a user or administrator. As may be appreciated, by automatically collecting images 107 of properties by garbage trucks on their normal and customary routes, no inspectors or additional employees are required to collect images 107 for blight or code violation detection which may result in reduced costs.

Other sources of images 107 may be used. These may include Google Street View and other commercial sources of images 107, images 107 collected by private individual or citizens, and images 107 connected by drones or other remote vehicles. For example, a city or municipality may control a fleet of one or more drones that capture images 107 of properties on a scheduled or regular basis.

In some embodiments, an image 107 of a property or parcel may be collected automatically in response to determining that the garbage truck is in front of a property. For example, each garbage truck may be equipped with a GPS or other location determination component. When the location of the garbage truck shows that the garbage truck has advanced to a next property, the cameras associated with the garbage truck may take one or more images 107 of the property. This may continue as the garbage truck moves from property to property.

Alternatively, rather than generate an image 107 automatically for each property, the cameras associated with the garbage truck (or other vehicle) may capture and generate an image 107 only when prompted or requested by an associated employee. For example, when the employee (e.g., sanitation worker) believes that a property adjacent to the garbage truck contains blight, the employee may trigger the camera or cameras associated with the garbage truck to take one or more images 107 of the property. These images 107 may then be provided to the score engine 130 for review. Depending on the embodiment, the employee may trigger the capture of an image 107 by pressing a button or switch, making a particular gesture, or speaking one or more keywords to a voice assistant, for example. Other triggers may be used.

In some embodiments, after the score engine 130 generates a score 133 for an image 107, the score engine 130 may determine whether the score is greater than a blight threshold. The blight threshold may be a threshold number that is used to determine whether a score 133 indicates that a property associated with the image 107 is blighted. The blight threshold may be set by a user or administrator. If the score 133 is above the blight threshold, the image 107 may be sent to a human reviewer for review. If the reviewer agrees that the property associated with the image 107 is blighted, the reviewer may take one or more actions such as sending a letter to the owner of the property, visiting the property for further inspection, or sending a fine or citation to the address associated with the property.

In some embodiments, the images 107 and scores 133 generated by the score engine 130 may be reviewed by one or more human reviewers. If the human reviewer agrees with the generated score 133, then positive feedback may be provided to the score engine 130. If the human reviewer disagrees with the generated score 133, then negative feedback may be provided to the score engine 130. The positive or negative feedback may be used by the training engine 120 to adjust or update the detection model 125. Any method for updating or re-training a model may be used. Depending on the embodiment, human reviewers may review each image 107 and score 133, some subset of the generated images 107 and scores 133, or only images 107 with scores 133 that exceed the blight threshold.

The score engine 130 may further generate, for each image 107, the set of features 135 of the image 107 that most contributed to the score 133. Each feature 135 may be provided with an amount or percentage that that the particular feature 135 added to the score 133. As will be discussed further below, these features 135 may be used to assess fines, or to recommend improvements to the owners of the associated properties that may reduce their score 133. Depending on the embodiment, each feature may correspond to a particular code violation.

Figure 2B:
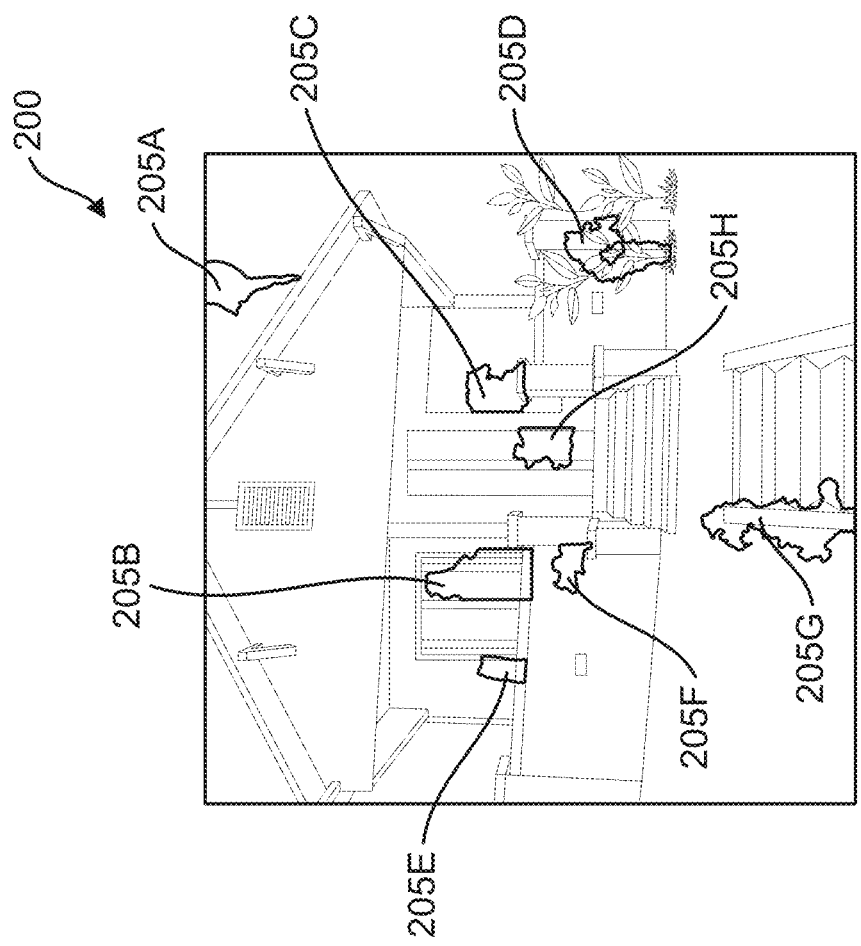
FIG. 2B is an illustration of the image of the first example showing a plurality of features.
Figure 2A:
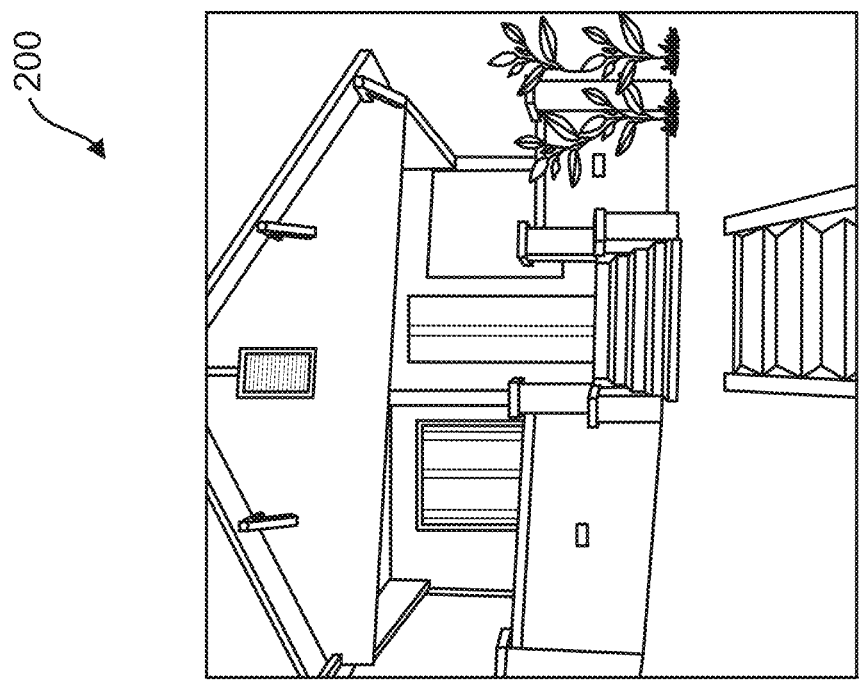
FIG. 2A is an illustration of an image of a first example property.
Figure 3B:
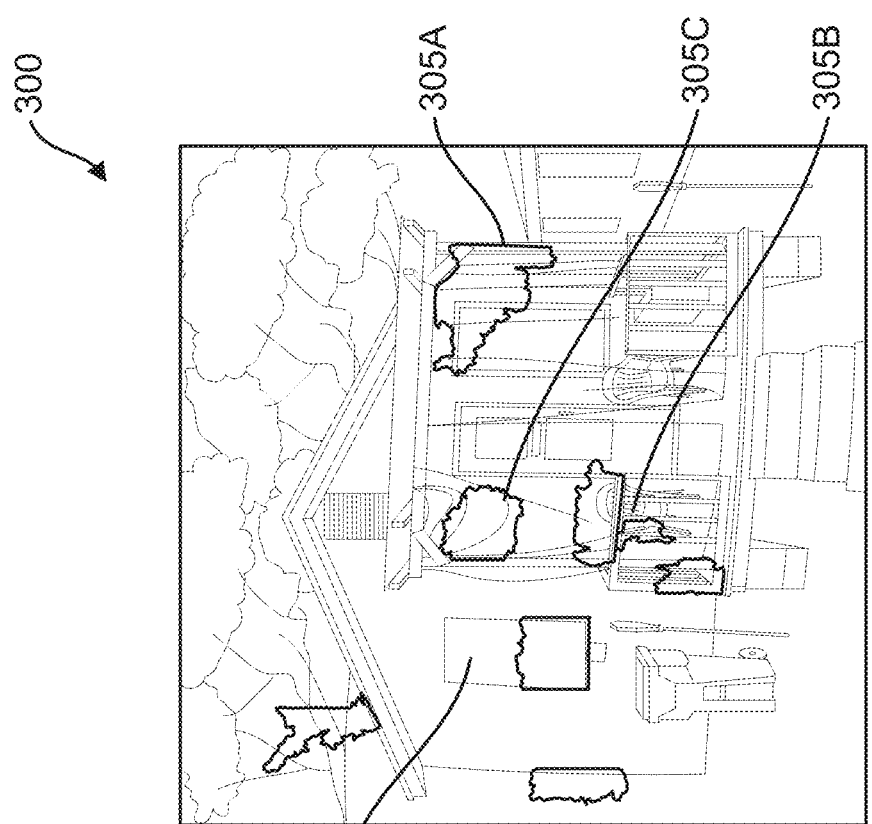
FIG. 3B is an illustration of the image of the second example showing a plurality of features.
Figure 3A:
FIG. 3A is an illustration of an image of a second example property.

For example, FIG. 2A is an illustration of an image 200 of a first property such as a house. FIG. 2B is an illustration of the image 200 with a plurality of features 135 (i.e., the features 205A-H) that were extracted from the image 200 by the score engine 130. FIG. 3A is an illustration of an image 300 of a second property. FIG. 3B is an illustration of the image 300 with a plurality of features 135 (i.e., the features 305A-D) that were extracted from the image 300 by the score engine 130. FIG. 4A is an illustration of an image 400 of a third property. FIG. 4B is an illustration of the image 400 with a plurality of features 135 (i.e., the features 405A-C) that were extracted from the image 400 by the score engine 130. FIG. 5A is an illustration of an image 500 of a first property. FIG. 5B is an illustration of the image 500 with a plurality of features 135 (i.e., the features 505A-G) that were extracted from the image 500 by the score engine 130.

Returning to FIG. 1, the object engine 140 may, for each image 107, determine the objects that correspond to the features 135 associated with the image 107. For example, the object engine 140 may process one feature 135 to determine that it likely corresponds to a gutter. As another example, the object engine 140 may process another feature 135 to determine that it likely corresponds to a boarded-up window. As yet another example, the object engine 140 may process another feature 135 to determine that it likely corresponds to peeling paint. Any method for object detection may be used. Depending on the embodiment, the object engine 140 may process each feature 135 using a library of objects that are commonly associated with blight or code violations such as boarded up windows, peeling paint, overgrown foliage, garbage or other debris, etc.

For example, returning to FIG. 2B, the object engine 140 may determine that the feature 205A corresponds to an object such as tree branches. The object engine 140 may determine that the features 205B and 205C correspond to objects such as a boarded-up windows. The object engine 140 may determine that the feature 205D corresponds to an object such as overgrown weeds. The object engine 140 may determine that the features 205E and 205F correspond to objects such as peeling paint. The object engine 140 may determine that the feature 205G corresponds to an object such as damaged concrete. The object engine 140 may determine that the feature 205H corresponds to an object such as a boarded-up door.

Returning to FIG. 3B, the object engine 140 may determine that the features 305A-305C correspond to objects associated with porch maintenance issues. The object engine 140 may determine that the features 305D corresponds to an object such as a window covered with a material or textile.

Returning to FIG. 4B, the object engine 140 may determine that the feature 405A corresponds to an object such plastic sheeting on a window. The object engine 140 may determine that the feature 405*b* corresponds to an object such as a damaged door. The object engine 140 may determine that the feature 405C corresponds to an object such as a damaged window.

Returning to 5B, the object engine 140 may determine that the feature 505A, 505*b*, 505D, and 505F correspond to an objects such as overgrown vegetation. The object engine 140 may determine that the feature 505C corresponds to an object such as a damaged window. The object engine 140 may determine that the feature 505E corresponds to an object such as a damaged door. The object engine 140 may determine that the feature 505G corresponds to an object such as a rusty mailbox.

Returning to FIG. 1, the report engine 150 may generate a report 150 for some or all of the images 107. Depending on the embodiment, the report engine 150 may generate a report for every image 107, or only images 107 whose associated score 133 is greater than the threshold.

Each generated report 155 may identify the property associated with the image 107 and may include the score 133 generated for the property associated with the image 107. Where the score 133 is above the threshold, the report 155 may indicate that the property is blighted and may assess a fine for the for the blighted property. The report 155 may further indicate and list the specific blighted conditions or code violations (e.g., broken window, and peeling paint) that have been detected. The report 155 may threaten to fine the property if some or all of the listed blighted conditions or code violations are not rectified by a certain date. Depending on the embodiment, the generated report 155 may be emailed or mailed to an address associated with an owner of the property associated with the image 107 or may be provided to a reviewer or administrator who may review the report 155 before it is sent to the owner of the property.

Each generated report 155 may further include a listing of some or all of the objects that were identified by the object engine 140 for the features 135 of the image 107 corresponding to the property. Each identified object may be accompanied by a corresponding code violation, if applicable. For example, if the object engine 140 detected objects associated with code violations such as peeling paint and broken concrete, the report 155 may indicate that the property associated with the image 107 has code violations related to the peeling paint and broken concrete. The objects (and associated features 135) may be highlighted in the image 107 and included in the report 155.

In some embodiments, the report 155 may recommend ways that the property owner can improve their property (i.e., mitigate the code violations) and improve their score 133 to be above the blight threshold. For example, if the image 107 of the property received a score 133 of 60 and the blight threshold is 50, the report 155 may recommend an improvement that will bring the score 133 down by at least 10 points. As described above, each feature 135 or code violation may have an associated percentage or number that indicates its overall contribution to the score 133. The report engine 150 may use these percentages to recommend repairs to the objects identified for the features 135 that minimizes the overall number of objects that may be repaired by the property owner or minimized the overall cost of repairs. Depending on the embodiment, the report engine 150 may maintain a database of costs typically associated with repairing each type of object.

For example, a report 155 may indicate that a property is blighted and received a score 133 of 80 due to code violations such as peeling paint, a broken sidewalk, and a broken window. The report 155 may further indicate that the peeling paint contributed 10 points to the score 133, the broken sidewalk contributed 30 points to the score 133, and the broken window contributed 50 points to the score 133. The report 155 may inform the property owner that by repairing the broken window their score 133 will likely drop below the blight threshold. Where not prohibited by law, the report 155 may further include an estimated cost for the repair and may further include names and contact information for contractors that have been vetted by the city to make the recommended repair. Other information may be included in the report.

Figure 6:
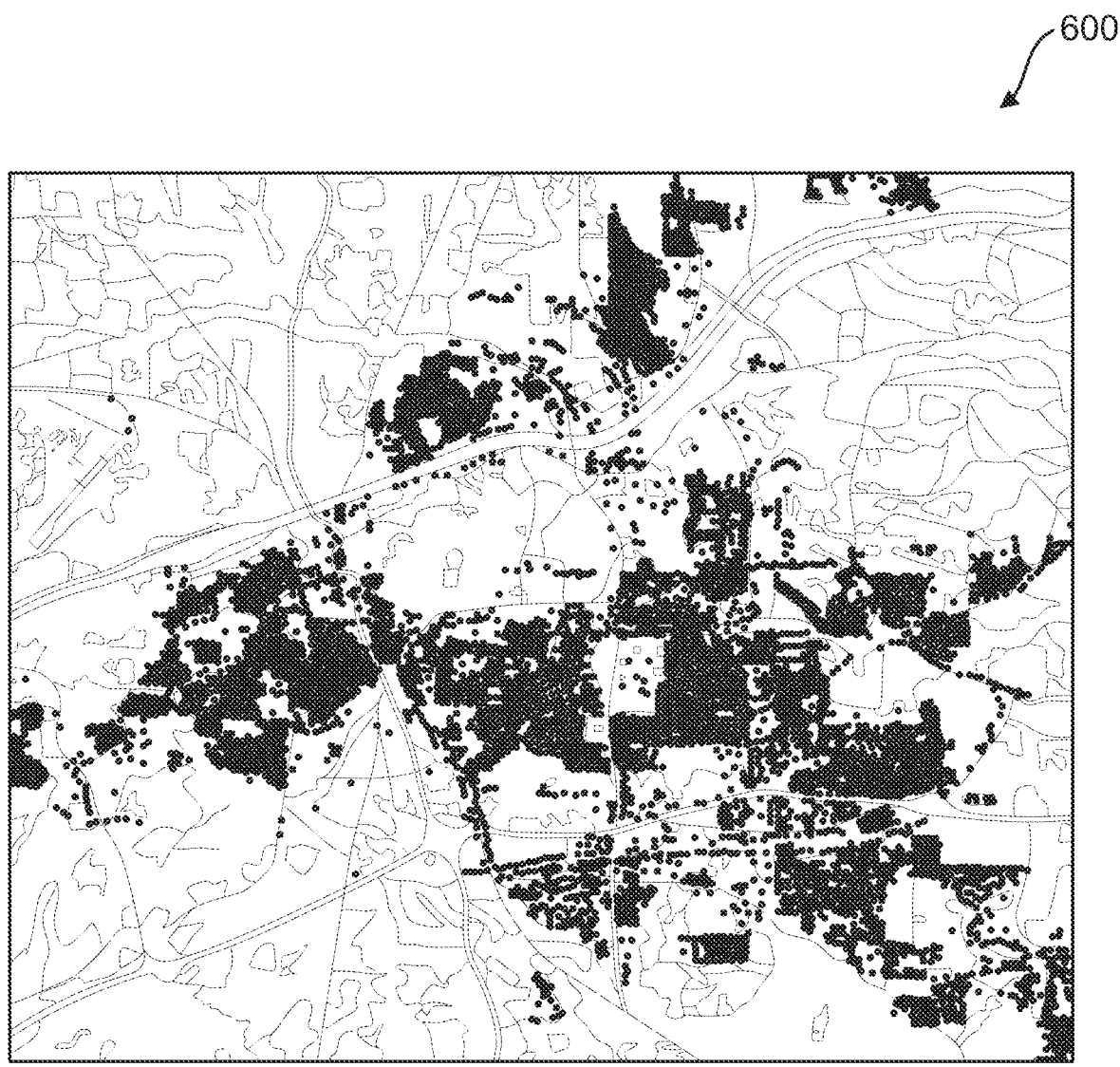
FIG. 6 is an illustration of a map of a plurality of properties showing scores.

FIG. 6 is an illustration of a map 600 of a plurality of properties showing scores 133. In some embodiments, the report engine 150 may provide a software tool through which a user or administrator may view the scores 133 corresponding to selected properties. In the example shown, the scores 133 for the properties in a selected city or neighborhood are displayed in different colors or shades which allows the user to quickly determine areas or locations that are likely to be associated with blight or code violations.

Figure 7:
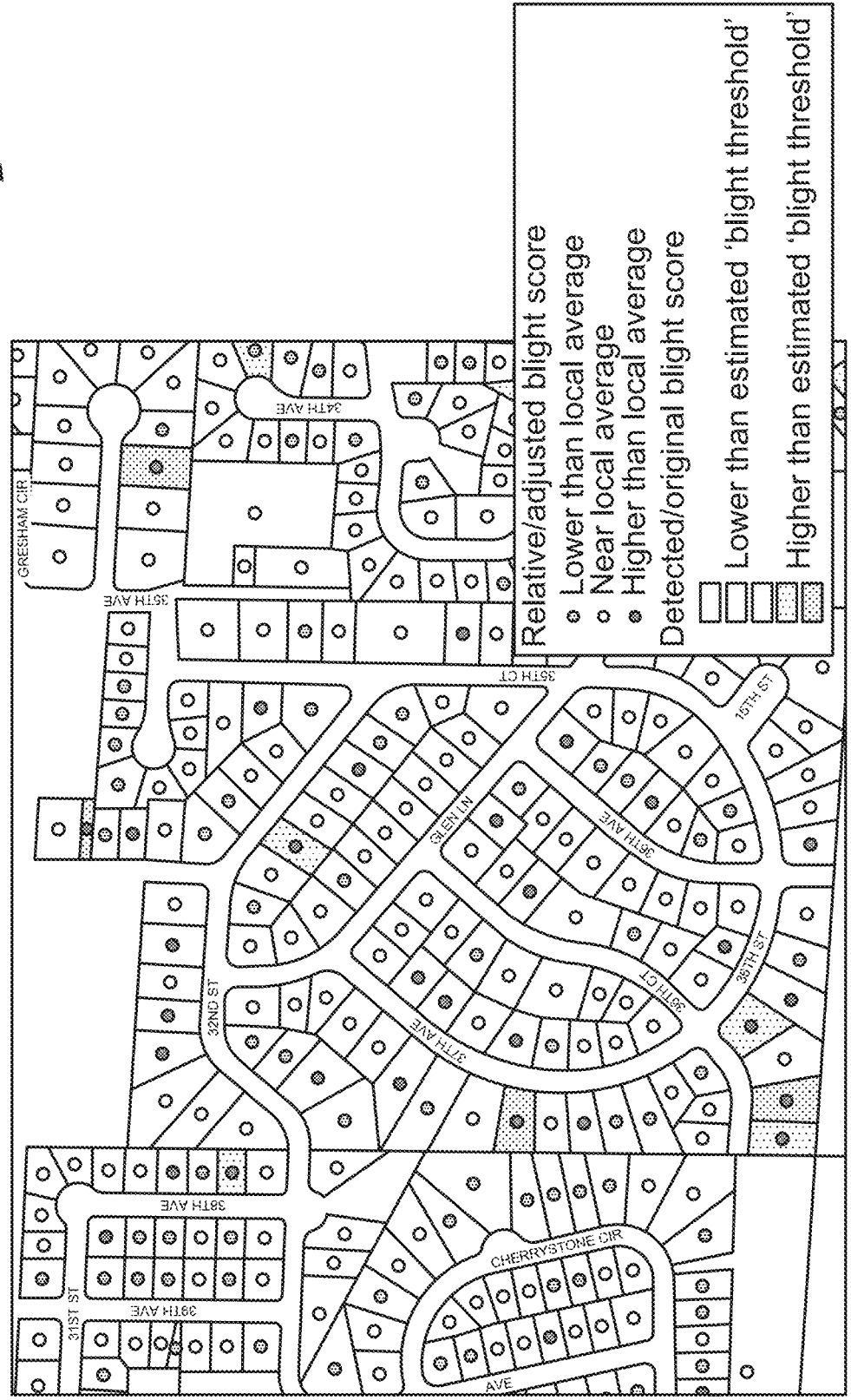
FIG. 7 is an illustration of a map of a plurality of properties showing relative scores.

In some embodiments, in addition to the score 133, the report engine 150 may generate what is referred to here as a relative score 133. The relative score 133 is meant to help city officials prioritize their intervention resources. The relative score weights a property's score 133 relative to that of its neighbors. For example, a partially rundown property may be a nuisance in a well maintained neighborhood but may not be considered a nuisance in a neighborhood where the houses are more rundown. This relative score 133 also ensures that the algorithm is more equitable in its diagnostics. FIG. 7 is an illustration of an example map 700 showing relative scores 133.

Figure 8:
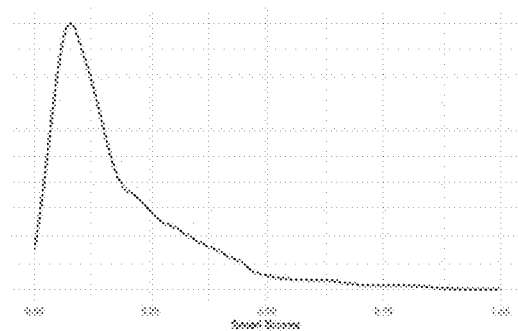
FIG. 8 is an illustration an example smart scores.

In some embodiments, in addition to the relative scores 133, the report engine 150 may further calculate what is known as a smart score 133. The smart score 133 for a property may be based on the relative score 133 for the property and may incorporate additional information such as the number of k-12 aged children in the neighborhood, crime rates, or other local data. A graph 800 of smart scores for a plurality of properties (e.g., parcels) is illustrated in FIG. 8.

Figure 9:
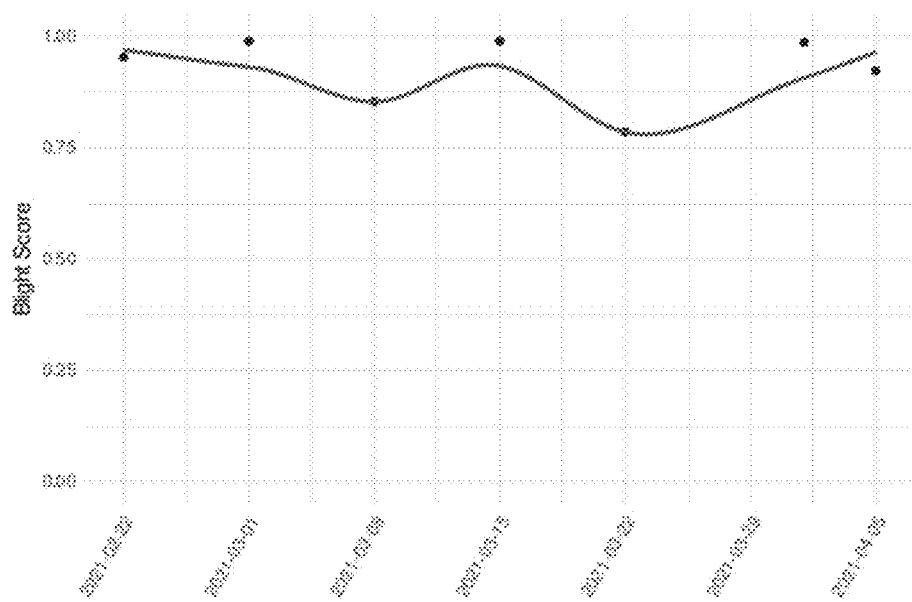
FIG. 9 is an illustration of a graph of scores over time for an example property.

FIG. 9 is an illustration of a graph 900 of scores 133 over time. A user or administrator may use the report engine 150 to generate a graph 900 of the scores 133 (regular, relative, or smart). The graph 900 for a property may allow the administrator to see how the property is trending (e.g., more blighted or less blighted). The trends may allow the administrator to target properties that are in danger of becoming blighted for intervention.

Figure 10:
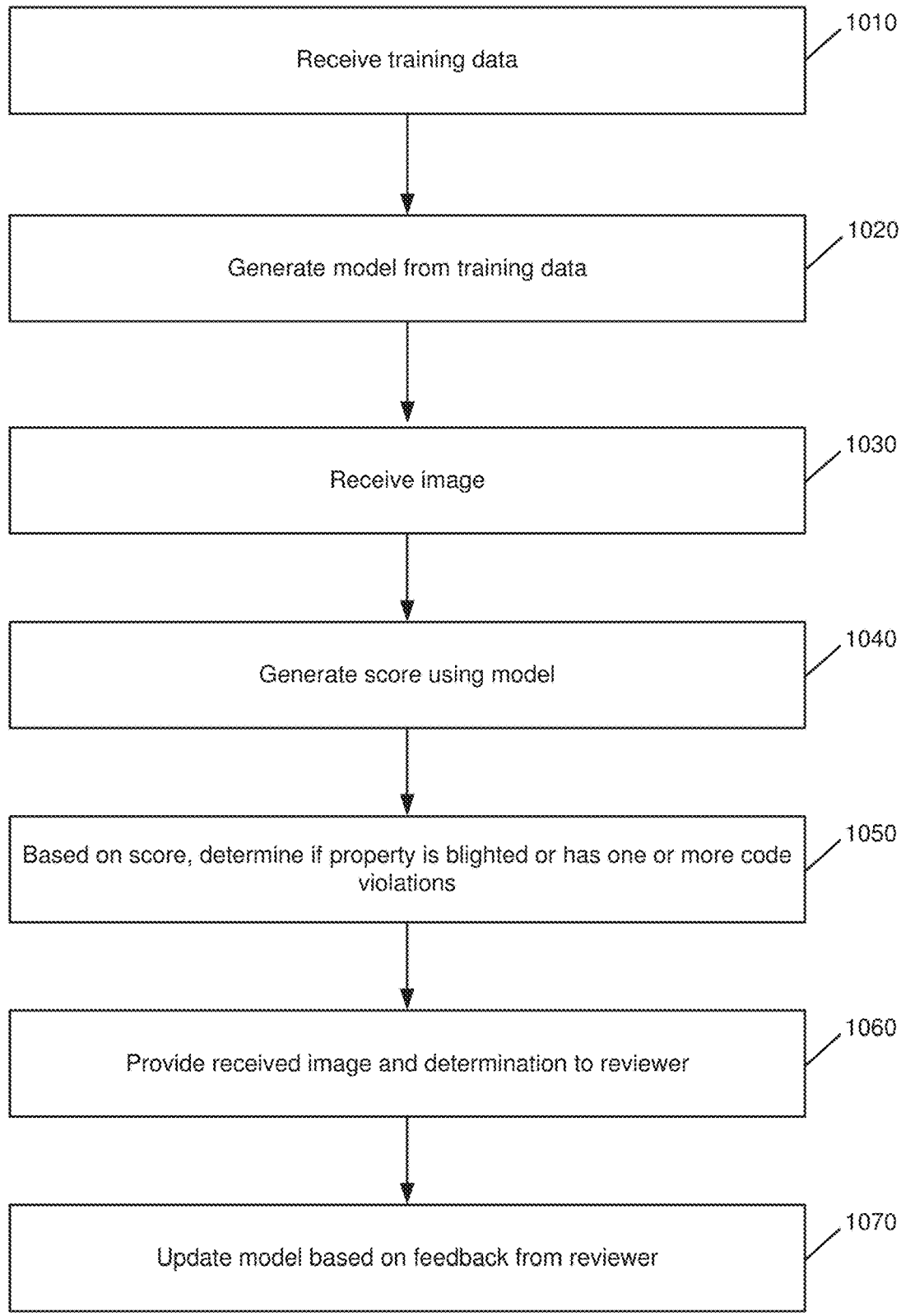
FIG. 10 is an illustration of a method for determining if a property is blighted or in violation of one or more codes.

FIG. 10 is an illustration of a method 1000 for determining if a property is blighted or has one or more code violations. The method 1000 may be performed by the detector 110.

At 1010, training data is received. The training data 105 may be received by the training engine 120. The training data 105 may include a first plurality of images that are known to be associated with blight or particular code violations and a second plurality of images that are known to not be associated with blight or particular code violations. Each image of the training data 105 may have been labeled by a human reviewer.

At 1020, a model is generated from the training data. The model 125 may be the detection model 125 and may be generated by the training engine 120 from the training data 105. Any method for generating a model may be used. The model 125 may take as an input an image 107 and may output a score 133 that represents how blighted the property depicted in the image 107 is and/or whether or not the property has any code violations. In addition, the model 125 may output a set of features 135 that were used to generate the score 133.

At 1030, an image is received. The image 107 may be received by the score engine 130 from a camera associated with a municipal vehicle such as a garbage truck. The image 107 may depict a property or parcel. In some embodiments, the image 107 may have a GPS or address that indicates where the image 107 was taken and/or where the property shown in the image 107 is located. The image 107 may have been taken automatically or in response to a commend or trigger received from an operator of the municipal vehicle.

At 1040, a score is generated for the image. The score 133 may be generated by the score engine 130 using the image 107. The higher the score 133 the more likely the image 107 depicts a property that is blighted or has code violations.

At 1050, whether the property is blighted and/or has code violations is determined. The determination may be made by the score engine 130 based on the score 133. In some embodiments, the property depicted in the received image 107 may be blighted or has one or more code violations if the score 133 is above (or alternatively below) a threshold. The threshold may be set by a user or administrator.

At 1060, the received image and determination are provided to a reviewer. The image 107 and determination of blighted or non-blighted (detected code violations) may be provided to an administrator or inspector to review by the score engine 130. Alternatively, the received image 107 and determination may only be provided to the reviewer for review when the determination is that the property depicted in the image 107 is blighted or has likely code violations.

At 1070, the model is updated based on feedback. The model 125 may be updated by the training engine 120 based on the feedback from the reviewer. The feedback may indicate whether or not the reviewer agreed with the determination with respect to the property depicted in the image 107.

Figure 11:
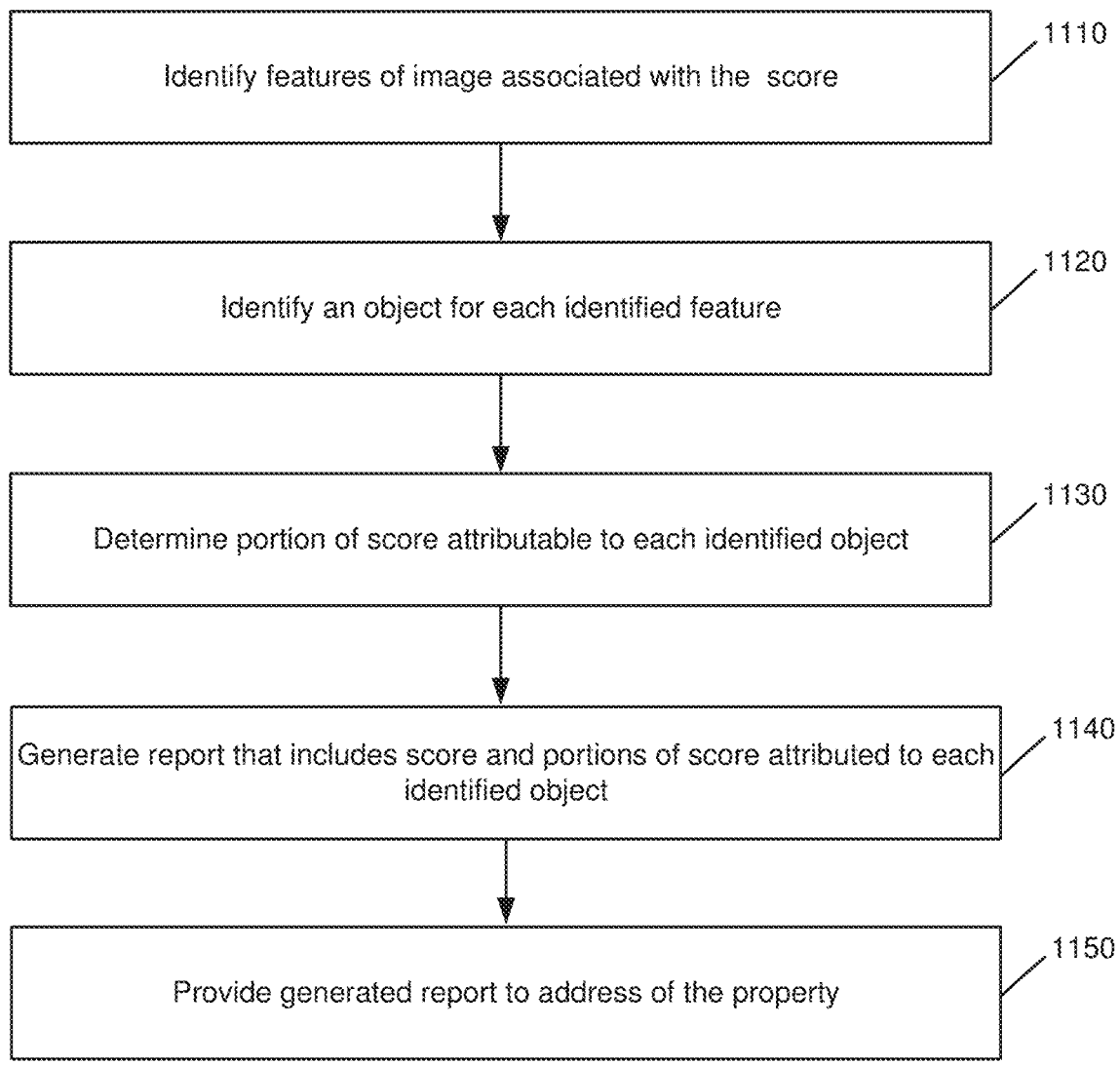
FIG. 11 is an illustration of a method for generating a report for an image indicating whether or not the property depicted in the image is blighted or in violation of one or more codes.

FIG. 11 is an illustration of a method 1100 for generating a report for an image indicating whether or not the property depicted in the image is blighted or has one or more code violations. The method 1100 may be performed by the detector 110.

At 1110, features of an image associated with a blight score or code violations are identified. The features 135 may be identified by the score engine 130 using one or more models 125. The image 107 may have been received by the score engine 130 from a municipal vehicle. The image 107 may be of a property such as a house. Other types of property may be supported such as sidewalks, roads and road segments, and trees, for example. The score 133 may have been generated for the image 107 by the score engine 130 using the model 125. Each feature 135 may be a contiguous region of related pixels from the image 107.

At 1120, an object is identified for each of the identified features. The objects may be identified by the object engine 140. The detected objects may be objects known to be associated with blight or code violations such as trash, overgrown weeds or foliage, broken concrete, boarded up or broken windows and doors, peeling paint, etc. Any method for detecting objects in images may be used.

At 1130, a portion of the score attributable to each identified object or code violation is determined. The portions of the score 133 may be determined by the object engine 140. In some implementations the determination may be made based on the portion of the score 133 associated with the feature 135 corresponding to each identified object 140 or code violation. As described above, the model 125 may indicate the portion of the score 133 that is attributable to each feature or code violation identified in the image 107.

At 1140, a report is generated. The report 155 may be generated by the report engine 150 and may include information such as the address of the property, the image 107 of the property, and the score 133 associated with the property. The report may further identify each object or code violation identified along with the portion of the score 133 associated with object or code violation. This may help the property owner determine how to best improve their score 133. The report 155 may further include contact information of contractors who help repair the property.

In some embodiments, the report 155 may include a fine for each code violation or may indicate that a fine will be assessed if each code violation is not corrected by a specified date. The fines for each type of code violation may be provided by a user or administrator.

At 1150, the generated report is provided. The report 155 may be provided by the report engine 150 to an address associated with an owner (or agent) of the property. The address may be a physical mailing address or an electronic address. Depending on the embodiment, the report 155 may be approved by a user or administrator before it is provided to the owner.

Figure 12:
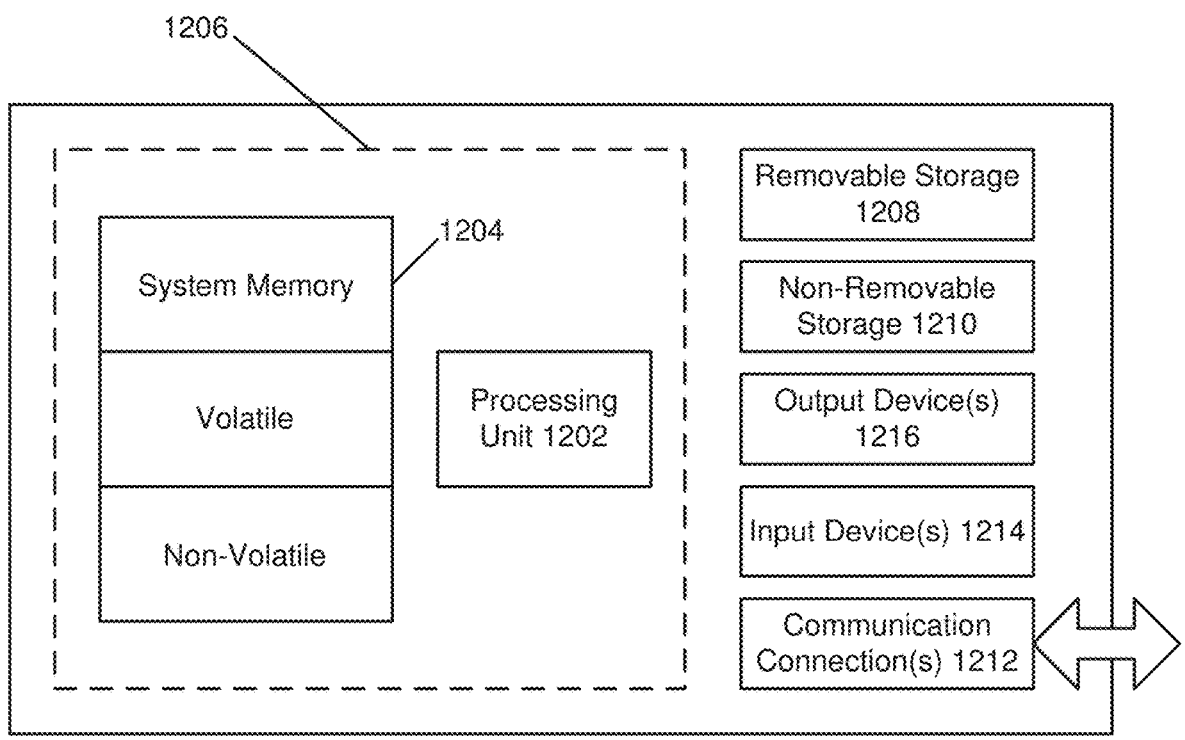
FIG. 12 shows an exemplary computing environment in which example embodiments and aspects may be implemented.

FIG. 12 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 1200. In its most basic configuration, computing device 1200 typically includes at least one processing unit 1202 and memory 1204. Depending on the exact configuration and type of computing device, memory 1204 may be volatile (such as random access memory (RAM)), non-volatile (such as read-only memory (ROM), flash memory, etc.), or some combination of the two. This most basic configuration is illustrated in FIG. 12 by dashed line 1206.

Computing device 1200 may have additional features/functionality. For example, computing device 1200 may include additional storage (removable and/or non-removable) including, but not limited to, magnetic or optical disks or tape. Such additional storage is illustrated in FIG. 8 by removable storage 1208 and non-removable storage 1210.

Computing device 1200 typically includes a variety of computer readable media. Computer readable media can be any available media that can be accessed by the device 1200 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 1204, removable storage 1208, and non-removable storage 1210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 1200.

Computing device 1200 may contain communication connection(s) 1212 that allow the device to communicate with other devices. Computing device 1200 may also have input device(s) 1214 such as a keyboard, mouse, pen, voice input device, touch input device, etc. Output device(s) 1216 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for detecting blighted properties or determining code violations comprising:
    receiving training data by a computing device, wherein the training data comprises a first plurality of images of properties with code violations and a second plurality of images of properties without code violations, wherein a property has a code violation when it does not comply with a particular state or local regulation, wherein the properties consist of homes or buildings;
    extracting a first set of features from the first plurality of images of properties with code violations by the computing device;
    extracting a second set of features of the second plurality of images of properties without code violations by the computing device;
    using machine-learning to generate, from the first and second set of features extracted from the first and second plurality of images, a model by the computing device;
    receiving a third plurality of images by the computing device, wherein each image of the third plurality of images depicts a property other than the properties associated with the first plurality of images or the properties associated with the second plurality of images, wherein each image of the third plurality of images is associated with GPS coordinates, and each image of the third plurality of images was captured automatically by a municipal vehicle upon detection by the municipal vehicle using a location determination component of the municipal vehicle that the municipal vehicle has advanced to the property depicted in the image; and
    for each image of the third plurality of images:
        using the model, generating a score for the property depicted in the image based on the image;
        based on the score, determining whether the property depicted in the image has one or more code violations; and
        providing the image to a reviewer by the computing device.

2. The method of claim 1, wherein each property is one or more of a house, a sidewalk, a road segment, or a tree.

3. The method of claim 1, further comprising, for each image of the third plurality of images:
    receiving feedback from the reviewer regarding the determination; and
    adjusting the model based on the received feedback.

4. The method of claim 1, further comprising, for each image of the third plurality of images:
identifying one or more features of the image that are associated with the score;
for each identified one or more features, detecting an object corresponding to the one or more features; and
generating a report for the property associated with the image, wherein the report identifies the detected object.

5. The method of claim 4, further comprising:
for each detected object, determining a portion of the score that is attributable to the detected object; and
providing the determined portion for each detected object in the report.

6. The method of claim 4, further comprising, for each image of the third plurality of images:
providing the report to an address associated with the property depicted in the image.

7. The method of claim 6, wherein the report comprises a fine or a required action.

8. The method of claim 1, wherein the municipal vehicle is a garbage truck.

9. The method of claim 1, further comprising, weighting the score generated for the property depicted in the image by the scores generated for properties that are neighboring the property depicted in the image to generate a relative score, and determining whether the property depicted in the image has one or more code violations based on the relative score.

10. The method of claim 1, further comprising, based on the one or more code violations, recommending one or more repairs to the property depicted in the image.

11. A system for detecting blighted properties or code violations comprising:
at least one processor; and
a memory storing instructions that when executed by the at least one processor cause the at least one processor to:
receive training data, wherein the training data comprises a first plurality of images of properties with code violations and a second plurality of images of properties without code violations, wherein a property has a code violation when it does not comply with a particular state or local regulation, wherein the properties consist of homes or buildings;
extract a first set of features from the first plurality of images of properties with code violations;
extract a second set of features of the second plurality of images of properties without code violations;
use machine-learning to generate, from the first and second set of features extracted from the first and second plurality of images, a model;
receive a third plurality of images, wherein each image of the third plurality of images depicts a property other than the properties associated with the first plurality of images or the properties associated with the second plurality of images, wherein each image of the third plurality of images is associated with GPS coordinates, and each image of the third plurality of images was captured automatically by a municipal vehicle upon detection by the municipal vehicle using a location determination component of the municipal vehicle that the municipal vehicle has advanced to the property depicted in the image; and
for each image of the third plurality of images:
using the model, generate a score for the property depicted in the image based on the image;
based on the score, determine whether the property depicted in the image has one or more code violations; and
provide the image and the determination to a reviewer.

12. The system of claim 11, wherein each property is one or more of a house, a sidewalk, a road segment, or a tree.

13. The system of claim 11, further comprising, for each image of the third plurality of images:
receiving feedback from the reviewer regarding the determination; and
adjusting the model based on the received feedback.

14. The system of claim 11, further comprising, for each image of the third plurality of images:
identifying one or more features of the image that are associated with the score;
for each identified one or more features, detecting an object corresponding to the one or more features; and
generating a report for the property associated with the image, wherein the report identifies the detected object.

15. The system of claim 14, further comprising:
for each detected object, determining a portion of the score that is attributable to the detected object; and
providing the determined portion for each detected object in the report.

16. The system of claim 14, further comprising, for each image of the third plurality of images:
providing the report to an address associated with the property depicted in the image.

17. The system of claim 16, wherein the report comprises a fine or a required action.

18. The system of claim 11, wherein the municipal vehicle is a garbage truck.

19. A method for automatically detecting blighted properties or determining code violations comprising:
attaching a camera and a location determination component to a municipal vehicle associated with a route;
for each property of a plurality of properties along the route, wherein the properties of the plurality of properties consist of homes or buildings:
detecting that the municipal vehicle has moved to a next property of the plurality of properties on the route by a computing device using the location determination component; and
in response to the detection, automatically causing the camera to capture an image of the next property;
transmitting captured images of each property of the plurality of properties to a detector by the computing device;
for each image of the captured images:
using a model and the image, generate a score for a property depicted in the image by the detector;
based on the score, determine whether the property depicted in the image has one or more code violations by the detector; and
provide the image and the determination to a reviewer by the detector.

* * * * *